(12) United States Patent
Phelan et al.

(10) Patent No.: US 6,624,748 B1
(45) Date of Patent: Sep. 23, 2003

(54) METHOD FOR MONITORING A CONDITION OF A TIRE

(75) Inventors: John Roux Phelan, Boulder, CO (US); Richard Stephen Pollack, Boulder, CO (US); Elyse Kristen Eschbach, Stow, OH (US); Gene Raymond Starkey, Niwot, CO (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/089,133

(22) PCT Filed: Oct. 1, 1999

(86) PCT No.: PCT/US99/23009
§ 371 (c)(1),
(2), (4) Date: Mar. 25, 2002

(87) PCT Pub. No.: WO01/25034
PCT Pub. Date: Apr. 12, 2001

(51) Int. Cl.[7] .................................................. B60C 23/00
(52) U.S. Cl. .................... 340/442; 73/146.5; 152/152.1
(58) Field of Search .............................. 340/442–448; 73/146.5, 146, 146.8, 146.2; 152/152.1, 151, 152, 154.1, 154.2

(56) References Cited

U.S. PATENT DOCUMENTS

| | | | | |
|---|---|---|---|---|
| 4,319,220 A | * | 3/1982 | Pappas et al. ............... | 340/447 |
| 5,218,861 A | * | 6/1993 | Brown et al. ............... | 73/146.5 |
| 5,562,787 A | | 10/1996 | Koch et al. .................. | 156/64 |
| 5,749,984 A | * | 5/1998 | Frey et al. ................... | 152/415 |
| 5,960,844 A | * | 10/1999 | Hamaya ..................... | 152/152.1 |
| 5,971,046 A | * | 10/1999 | Koch et al. ................. | 152/152.1 |
| 5,977,870 A | * | 11/1999 | Rensel et al. ................ | 340/447 |
| 6,087,930 A | * | 7/2000 | Kulka et al. ................. | 340/447 |
| 6,339,956 B1 | * | 1/2002 | Huinink et al. .............. | 73/146 |
| 6,546,982 B1 | * | 4/2003 | Brown et al. ............. | 152/152.1 |

FOREIGN PATENT DOCUMENTS

| | | |
|---|---|---|
| DE | 37 05 617 | 9/1988 |
| DE | 44 02 136 | 7/1995 |
| EP | 0389406 | 9/1990 |
| EP | 0936089 | 8/1999 |
| GB | 2088607 | 6/1982 |
| WO | WO96/28311 | 9/1996 |
| WO | WO98/56606 | 12/1998 |
| WO | WO01/25033 | 4/2001 |

* cited by examiner

*Primary Examiner*—Benjamin C. Lee
(74) *Attorney, Agent, or Firm*—Howard M. Cohn (57) ABSTRACT

Provided is a method of monitoring conditions of a pneumatic tire comprising a central tread, one or more belt(s) disposed radially inwardly of the tread and an inner-liner disposed radially inwardly of the belt(s), the belt(s) having a side edge. An electronic tag and associated condition sensors are disposed within the tire. The method includes: sensing a first temperature which is temperature of the tire inner-liner adjacent to the bet edge with the electronic tag; sensing a second temperature which is the air temperature within the tire with the electronic tag; and sensing air pressure within the tire with the electronic tag.

10 Claims, 7 Drawing Sheets

METHOD FOR MONITORING A CONDITION OF A TIRE

TECHNICAL FIELD

The present invention is generally concerned with a process and apparatus for monitoring a condition of a tire, and more particularly with a process and apparatus for monitoring a condition of a pneumatic tire for diagnosing an impending failure thereof.

BACKGROUND OF THE INVENTION

In order to transport bulk materials, such as coal, iron ore and other minerals, the mining industry uses Off-The-Road (OTR) vehicles that typically weigh up to 250 tons when fully loaded, with the result that exceedingly high internal stresses are imposed on the tires of such vehicles in the course of their daily use. Such internal stresses, which are primarily attributable to a number of factors including driving at excessive speeds, are so destructive of such tires that it is not uncommon to have to replace the tires. On the other hand, in order to maximize the productivity of OTR vehicles, they are normally driven as fast as possible until a user perceives that the internal physical condition of any given tire is marginal. Whereupon, the operator either stops, in the case of a loss of tire pressure, or reduces the speed of the vehicle, in the case of an excessive temperature condition, to relieve the internal stresses giving rise to the marginal condition, thereby prolonging the life of the tires. Thus the speed of an OTR vehicle is controlled on the basis of the operator's perception of the condition of the tires at any given time. And, if the operator's perception is erroneous, the productivity of the vehicle is unnecessarily reduced.

Accordingly, a long-standing need of the mining industry has been to ensure that the operators of OTR vehicles are provided with accurate information concerning various conditions of the tires of such vehicles, with a view to maximizing the productivity of the vehicles.

Various attempts have been made in the prior art to meet the aforesaid need, most recently by mounting integrated circuits within each of the tires of an OTR vehicle, for detecting respective conditions related to an imminent failure of each tire and providing the OTR vehicle operators with timely information concerning such conditions.

For example, U.S. Pat. No. 5,562,787, issued to Koch et al., disclosed a method and apparatus for monitoring respective conditions in the tires of vehicles. The apparatus comprises a monitoring device that is connectable to the interior of a tire and includes an integrated circuit having a transmitter. In addition, the monitoring device includes a plurality of sensors connected to the integrated circuit. The sensors continuously detect respective conditions of the tire and provide corresponding signals to the integrated circuit. The integrated circuit is programmed to periodically sample the tire condition signals, to compare the respective samples to respective standards, to generate respective tire condition signals based on the comparisons, and to provide an information signal to the operator of the vehicle when any tire condition signal is indicative of a marginal condition of the tire. In addition, the integrated circuit is programmed to be normally dormant but to transmit information signals concerning the then current tire condition signal to the operator in response to receiving a wake-up signal from the operator. Moreover, the integrated circuit may also be programmed to store data corresponding to periodic tire condition signals for historical, record keeping, purposes, and to cause the transmitter to transmit such historical data in response to receiving another wake-up signal.

As discussed in European Patent No. EP 0 936 089 A2, published Aug. 18, 1999, in order to avoid the stress, strain, impact and cyclic fatigue that such monitoring devices are ordinarily exposed to when mounted within a tire, the prior art integrated circuits along with the attached transmitter and sensors have been encapsulated in rigid or semi-rigid materials, such as urethanes, epoxies, polystyrene resins, hard rubber compounds, or the like. The encapsulations have then been assembled with a battery connected thereto. The resulting assembly, know in the prior art as an electronic tire tag, has then been wrapped with a green rubber material forming a housing therefor, and the housing has thereafter been added to the structural green rubber material forming a tire assembly and been vulcanized therewith for forming a cured tire. The cured tire thus includes an electronic tire tag embedded in the tire and forming a part thereof, and is discarded when the tire is discarded.

To provide for repair and replacement of such electronic tire tags, the aforesaid European Patent, which is assigned to the assignee of the aforesaid U.S. Patent, discloses a method and apparatus for removably mounting such tags within a tire. The apparatus includes a rubber patch, which may be vulcanized with the tire but is preferably separately vulcanized and attached to a vulcanized tire. The rubber patch includes a housing having a cavity formed therein. The cavity has a sidewall and is dimensioned for removably receiving therein the electronic tire tag. The electronic tag of the European Patent includes the above discussed structure of the U.S. Patent, including a transmitter, sensors and a battery, it being noted that the aforesaid U.S. Patent is incorporated by reference into, and made a part of, the European Patent. In addition, the European Patent calls for the optional inclusion of an antenna extending from the encapsulation. Assuming the provision of the antenna, opposed slots are formed in the sidewall of the housing for receiving the antenna when the tag is removably connected to the housing of the rubber patch. For retaining the tag in the housing, the housing and tag are respectively provided with compatible connecting means, such as the structures discussed in the European Patent, wherein the tag is either removably pinned, splined, threadably connected or interlocked to the housing.

Notwithstanding the aforesaid advancements of the prior art, the data provided to the operators of OTR vehicles, concerning the temperature conditions of the tires of such vehicles, continues to inaccurately reflect marginal conditions of the tires, due to various factors. For example, the practice of the prior art is to mount electronic tire tags centrally of the innerliner of a tire, in order to minimize the effects of stress, strain, impact vibration and cyclic fatigue imposed on the electronic tags. As a result, the monitoring devices sample tire temperatures at a location that is removed a considerable distance from the area of the tire where the temperature is most closely indicative of a marginal condition signaling an impending breakdown of the tire, that is, the temperature at the side edges of the belts, and thus near the shoulder portions of tires, where delaminations of the ply, belts and surrounding rubber materials occur due to the build up of internal stresses. In order to compensate for the difference between the sensed temperature and the temperature at such side edges, the prior art integrated circuits have algorithms that apply a scaling constant to the sensed temperature to calculate the temperature from the center of the innerliner to the vicinity of the shoulder portions of the tire. Unfortunately, the tire temperature at the center of the innerliner of a given tire may be significantly less than the temperature at shoulder portions of the tire, and change with different tire designs.

Accordingly, in addition to the problem of tag location, it has been found that the prior art algorithms inaccurately calculate the temperatures at the side edges of the belt, due to such calculations being based on adding a constant temperature factor to the temperature measured at the centerline of the tire to compensate for the distance that the temperature sampling sensor is spaced from the side edges of a belt. Since the location of the temperature sensors and such calculations result in providing erroneous information to the operators of OTR vehicles, the operators may prematurely reduce the speed of such vehicles. The consequent adverse effect on the productivity of such vehicles is costly to the mining industry.

SUMMARY OF THE INVENTION

According to the invention, there is disclosed a method of monitoring conditions of a pneumatic tire. The pneumatic tire comprises a central tread, one or more belt(s) disposed radially inwardly of the tread and an innerliner disposed radially inwardly of the belt. The belt(s) having a side edge. An electronic tag and associated condition sensors are disposed within the tire. The method includes the steps of sensing a first temperature which is the temperature of the tire innerliner adjacent to the belt edge with the electronic tag. A second temperature is sensed which is the air temperature within the tire with the electronic tag. Also, the air pressure within the tire is sensed with the electronic tag.

The sensing of the conditions is performed by sensing at a sequence of discrete time intervals. A value of one or more of the conditions sensed at an immediately previous time interval is compared to a current value of the one or more conditions. At a current time interval, the process includes the step of determining whether select one or more of the conditions has changed by a threshold amount since an immediately previous time interval.

The select one or more conditions is either or both of the first and second temperatures and the threshold amount is plus or minus two degrees centigrade. Further, the select one or more conditions is the air pressure within the tire and the threshold amount is plus or minus two pounds per square inch.

Also according to the method, the electronic tag can be disposed adjacent a shoulder portion of the tire and/or at an area of the innerliner where the tire is thickest. The electronic tag can also be disposed at an area of the innerliner where the tire is least able to dissipate heat or at an area of the innerliner where the temperature samples are the most closely related to determining whether or not an internal breakdown of the tire is imminent.

Also according to the invention, there is disclosed a method of monitoring at least one condition of a pneumatic tire (10), the pneumatic tire by disposing an electronic tag within the tire adjacent a shoulder portion of the tire. The at least one condition is selected from the group consisting of a first temperature which is the temperature of the tire innerliner adjacent to the belt side edge, a second temperature which is the air temperature within the tire; and air pressure within the tire. The sensing the at least one condition is by performing sensing at a sequence of discrete time intervals. Also the method includes comparing a value of the at least one condition sensed at an immediately previous time interval to a current the value of the at least one condition. The steps include at a current time interval, determining whether the at least one condition has changed by a threshold amount since an immediately previous time interval.

BRIEF DESCRIPTION OF THE DRAWINGS

As shown in the drawings, wherein like reference numerals designate like or corresponding parts throughout the several views.

DEFINITIONS

"Bead" generally means an annularly shaped, member located within either of the inner radial end portions of a tire;

"Bead Portion" generally means either of the opposed radial inner end portions of the carcass of a tire including a bead, the portion of a ply which is looped about the bead, and the rubber material surrounding the bead and ply portion.

"Carcass" generally means the tire structure including the beads and ply, but excluding the belt structure, undertread over the ply and the tread.

"Equatorial Plane" means the imaginary plane extending perpendicular to the axis of rotation of the tire and passing through the center of the tread; or the plane containing the circumferential centerline of the tread.

"Ply" generally means a cord-reinforced layer of rubber-coated, radially deployed material.

"Radial" mean directions extending radially toward or away from the axis of rotation of the tire.

"Sidewall" generally means the radially-extending portion of a tire.

"Tread width," means the arc length of the outer circumference of the tread of a tire as viewed in transverse cross-section.

DESCRIPTION OF THE PREFERRED EMBODIMENTS

Figure 1:
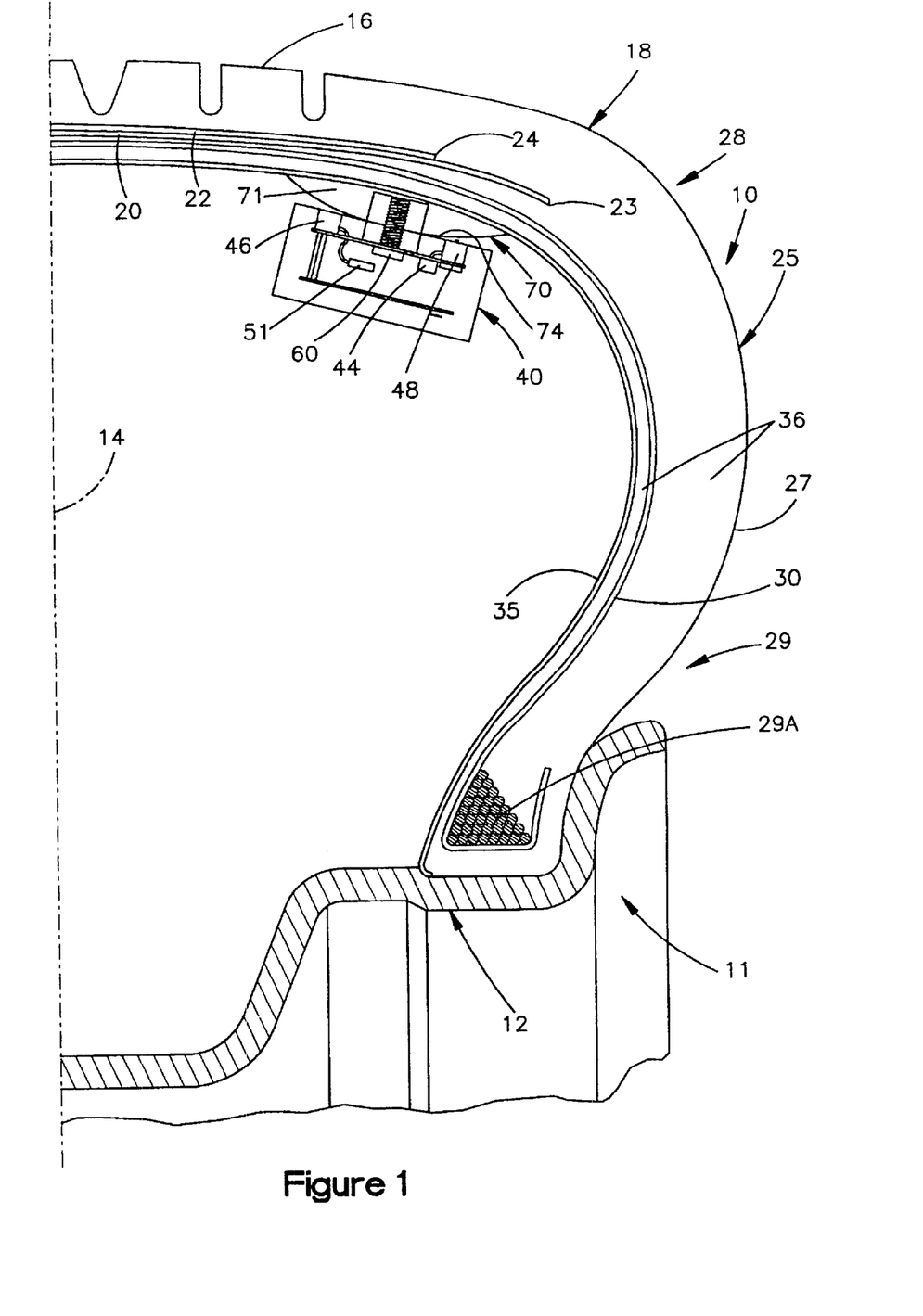
FIG. 1 is a partial, one-half, cross-sectional view of a pneumatic tire having mounted therein an electronic tire tag according to the invention.

FIG. 1 shows half of a partial transverse cross-sectional view of a typical pneumatic tire 10, for an OTR vehicle 11, mounted on a wheel rim 12 thereof. Since the tire 10 is generally toroidally-shaped and symmetrically arranged with respect to an imaginary equatorial plane 14, the transverse cross-section of the other partial half of the tire includes like or corresponding parts, and it should be understood that the explanation applies to the other half of the tire 10 as well.

The tire 10 which has a cavity 16 for receiving pressurized air when the tire is mounted on the wheel rim 12, generally comprises a central tread 16 having opposite sides generally indicated by the numeral 18. In addition, the tire 10 includes a plurality of radially-extending belts, exemplified by the belts 20 and 22, that are centrally disposed radially-inwardly of the tread 16. The belt 20 has opposite side edges 23, and the belt 22 has opposite side edges 24. Further, the tire 10 includes a carcass 25 having opposite sidewalls 27. The respective sidewalls 27 merge with and radially-extend inwardly from opposite tread sides 18 and form therewith opposite shoulder portions generally indicated by the numeral 28. The carcass 25 also includes opposite bead portions 29 at the radial inner ends thereof. Each of the bead portions 29 includes an annularly-shaped bead 29A therein for urging the bead portions 29 into abutment with the wheel rim 12. Moreover, the carcass 25 includes one or more plies 30, radially disposed inwardly of the belts 20 and 22. The ply 30 radially extends between and is looped about the opposed beads 29A. And, the carcass 25 includes a radially extending innerliner 35 disposed radially inwardly of the ply 30.

According to the invention, an electronic tire tag 40 (FIGS. 1 and 2) is preferably fixedly secured to the innerliner 35 of the tire 10 at an area thereof which is located substantially directly radially-inwardly of a side edge 23 of the belt 20 that is closest to the innerliner 35 of the tire 10 and thus adjacent to a shoulder portion 28 of the tire 10. Since the tag 40 is thereby located adjacent at the an area of the innerliner 35 where the tire 10 is thickest and least able to dissipate heat, the temperature measurements taken at this location are the most closely related to determining whether or not an internal breakdown of the tire 10 is imminent. The breakdown is typically due to internal stresses causing delaminations of the belts 20 and 22, ply 33 and surrounding vulcanized rubber material 36 at the shoulder portions 28 of the tire 10. FIG. 1 also shows the relative dimensions of the width "w1" of the tire tread 16 of a typical OTR vehicle 11, that is, substantially 3 to 4 feet, and the width "w2" of the tag 40 connected thereto, that is, substantially 3 inches.

The electronic tag 40 (FIGS. 1 and 2) generally comprises a microcontroller 42 and first temperature sensing structure 44 electrically connected thereto for sampling the temperature of the innerliner 35 of the tire 10. In addition, the tag 40 includes second temperature sensing structure 46 electrically connected to the micro-controller 42 for sampling the air temperature within the tire 10. Further, the tag 40 generally includes pressure sensing structure 48 electrically connected to the micro-controller 42 for sampling the air pressure within the tire 10. Moreover, the tag 40 includes transmitter structure 50 electrically connected to the microcontroller 42 for transmitting relevant information concerning the respective samplings taken by the temperature and pressure sensing structures 44, 46 and 48. Still further, the tag 40 preferably includes a battery 51 that is conventionally electrically connected to the microcontroller 42 for energization thereof. The pressure sensing structure 48 includes a tubular portion 52 thereof extending from the tag 40. In addition, the transmitter structure 50 preferably includes an antenna 58. The tag 40 also includes structure 60 for connecting the tag 40 to the tire 10. The connecting structure 60 preferably includes a first internally threaded nut 62, and an externally threaded bolt 64. The bolt 64 is permanently threadably connected to the first nut 62 and has a threaded portion 64 thereof extending from the tag 40. The tag 40 is preferably entirely encapsulated in a encapsulation material 65 such as a mixture of epoxy and glass beads coated with urethane.

The encapsulated tag 40 (FIG. 2) is preferably not directly connected to the innerliner 35 of the tire 10. Rather, according to the invention, a vulcanized rubber patch 70, having embedded therein a second internally threaded nut 71, is affixed to the innerliner 35 of the tire 10. Preferably, the patch 70, has a lens-shaped transverse cross-section, defined by a substantially flat side 72 having a generally circular perimeter being connectable to the innerliner 35 of the tire 10 and an arcuately-shaped inner side 73 disposed on the opposite side of the patch. Side 72 of the patch 70 is dimensioned for disposition in abutment with the substantially arcuately shaped area of the innerliner 35 of the tire 10 at the shoulder portion 28 thereof. Side 73 of the patch 70 faces the interior of the tire 10. The encapsulated tag 40 has a substantially rectangularly-shaped transverse cross-section and includes a substantially straight side 74. The encapsulated tag 40 is connected to the patch 70 by threadably connecting the bolt portion 64A, extending from the tag 40, to the second nut 71. Due to the arcuate shaped transverse surface 73 of the patch 70, the side surface 74 of the attached tag 40 is separated from the patch 70 along substantially one-half of the arcuately shaped surface 73 of the patch 70. A generally circular central portion 73A of the surface 73 is substantially in abutment with surface 74 when the bolt portion 64A of the tag 40 is threadably connected to the nut 71 of the patch 70. Concurrently, the bolt portion 60 (FIG. 1) of the connected tag 40 is located substantially in abutment with an area of the innerliner 35 adjacent to a belt edges 21 at the shoulder portion 28 of the tire 10 for sensing the temperature thereat. While the connected tag 40 is preferably located at the shoulder portion 28 adjacent to the ends of the one or more belts 20,22, it is also within the terms of the invention to locate the tag 40 near or on the center line 14 of the tire 10.

Preferably, the first temperature sensing structure 44 (FIG. 2) is then conventionally thermally connected through the interconnection substrate 4, such as a printed circuit board (PCB), to bolt 64 for sensing the temperature thereof and thus the temperature at the innerliner 35 where the patch 70 is attached.

Figure 2:
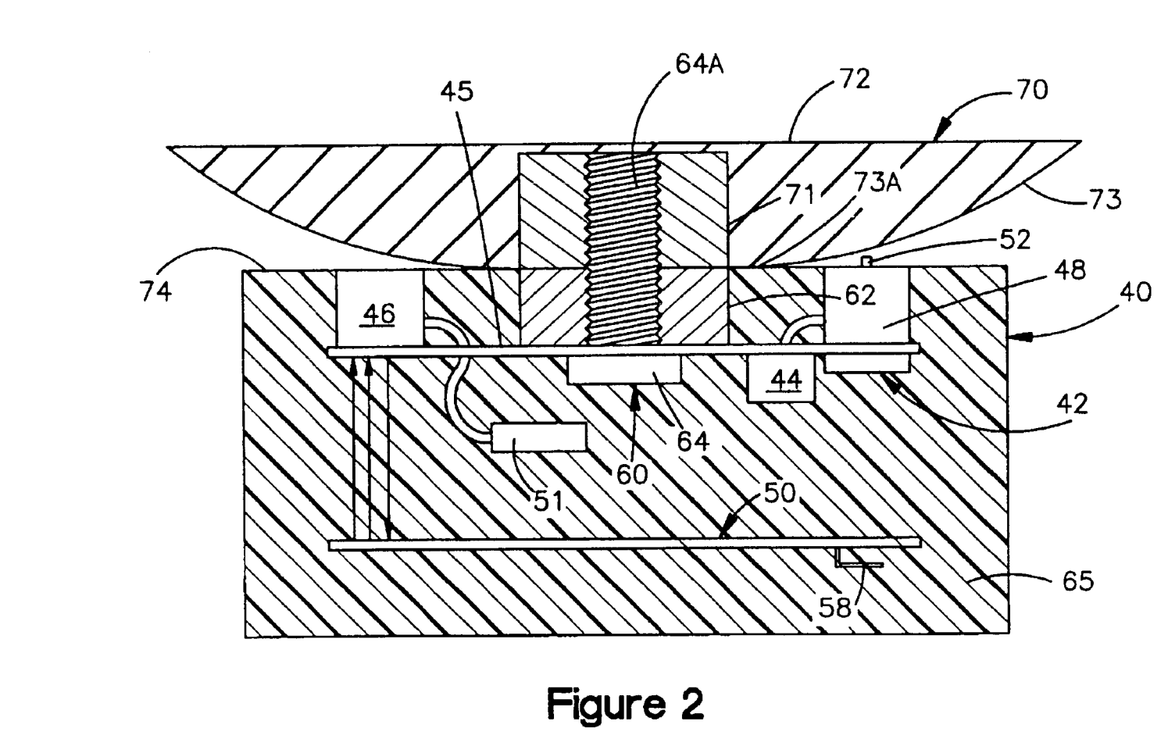
FIG. 2 is an enlarged transverse cross-sectional view of the general details of the tag of FIG. 1, showing the encapsulating and mounting structures thereof.

The aforesaid arcuate transverse cross-section of the patch 70 (FIG. 2) is believed to prevent the patch 70 and attached tag 40, or the tag 40 and attached nut 71, from separating from the tire 10 in the course of rotation thereof. In this connection it is noted that as the tire tread 16 (FIG. 1) adjacent to the area of the innerliner 35 where the patch 70 and tag 40 tag are connected thereto rolls into contact with the ground, the tread 16, and thus the innerliner 35 and the radially outwardly extending side 72 of the attached patch 70, flatten. Thereafter, as the tire tread 16 (FIG. 1) adjacent to the area of the innerliner 35 where the patch 70 and tag 40 are connected thereto rolls out of contact with the ground, the tread 16 and thus the innerliner 35 and the radially outwardly extending side 72 of the attached patch, abruptly assume the arcuately-shape form thereof show in FIG. 1. As a result of the abrupt conformation of the innerliner 35 and the radially outwardly extending substantially flat side 72 of the patch conforming to the arcuately-shaped form thereof shown in FIG. 1, the flexure stress imposed on the patch 70 and attached tag 40 may cause patch 70 and attached tag 40, or the tag 40 and attached nut 71, to eventually separate from the innerliner 35 of the tire 10 in the course of rotation thereof. It has been determined that when the inwardly extending side 73 of the patch 70 is arcuately shaped as shown in FIG. 2, the patch 70 is able to flex without imposing significant flexure stresses on the attached tag 40.

Figure 3:
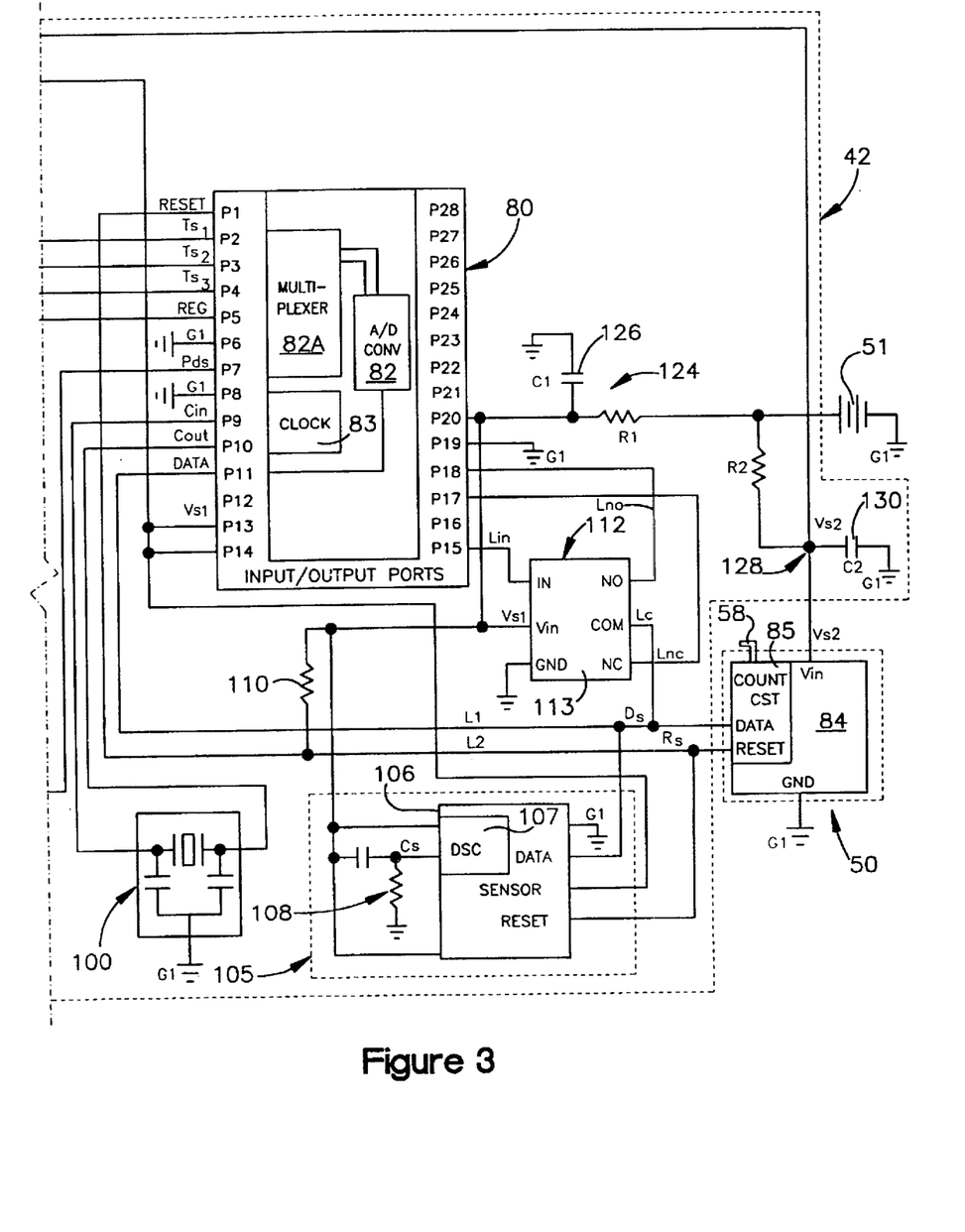
FIG. 3 is a block diagram of a portion of an electronic control system according to the invention.

As shown in greater detail in FIG. 3, the micro-controller 42 includes a first conventional microprocessor 80, having ports p1 through p28 inclusive. The first microprocessor 80 internally includes a conventional analog to digital (A/D) converter 82. In addition, the first microprocessor 80 internally includes a conventional multiplexer 82A that is conventionally electrically connected to a plurality of the ports, p2–p5 and p7, of the microprocessor 80. Moreover, the microprocessor 80 internally includes a conventional clock circuit 83 connected to ports p9 and p10 thereof.

Figure 4:
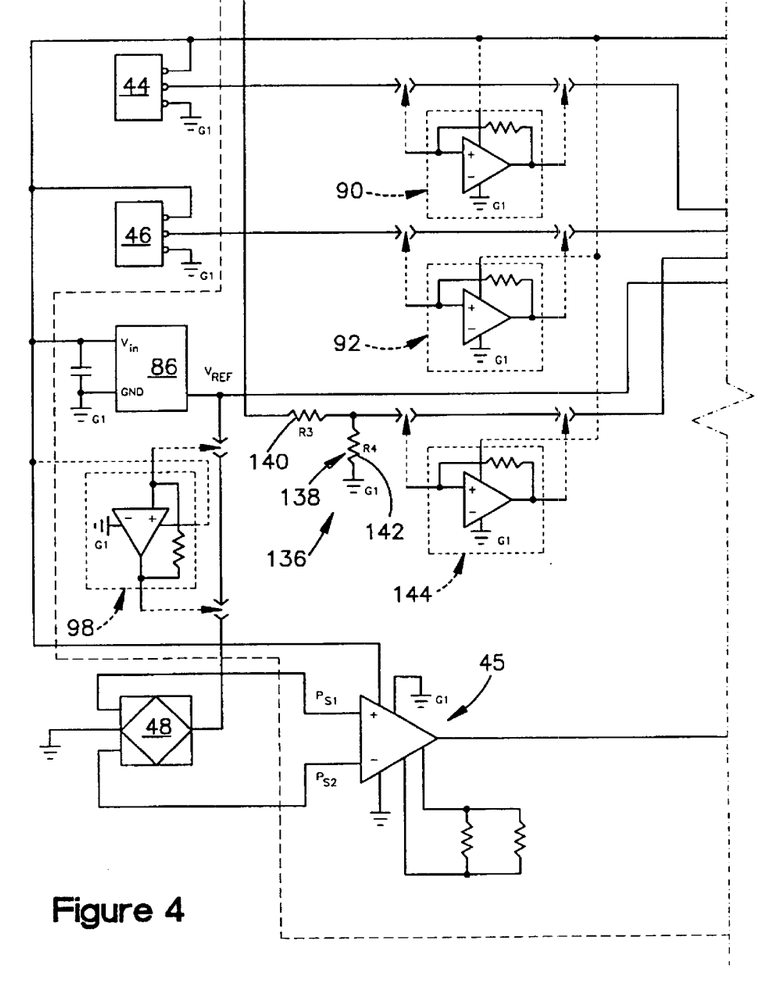
FIG. 4 is a block diagram of another portion of the electronic control system shown in FIG. 3.

Further, the transmitter structure 50 (FIG. 3) includes a second conventional microprocessor 84 having an internal counting circuit 85, that is conventionally electrically connected to the first microprocessor 80, at port p11 thereof, for receiving and sending respective reset signals "Rs" and data signals "Ds" via respective data and reset leads "Ld " and "Lr". Preferably, the first and second temperature sensing structures 44 and 46 (FIG. 4), are directly electrically connected to the first microprocessor 80, at ports p2 and p3 thereof, for providing respective first and second temperature sampling signals "Ts1" and "Ts2" thereto. Optionally, the micro-controller 42 may include first and second operational amplifiers, 90 and 92, respectively connected between the first and second temperature sensing structures 44, 46, and the first microprocessor 80 for providing amplified temperature sampling signals, Ts1 and Ts2, thereto. In addition, the micro-controller 42 preferably includes an instrumentation amplifier 95, conventionally electrically connected between the pressure sensing structure 48 and the first microprocessor 80, at port 7. Furthermore, the micro-controller 42 preferably includes conventional reference voltage generating structure 96 that is preferably directly connected to the pressure sensing structure 48, for providing respective reference voltage signals "Vref" thereto. The reference voltage generating structure 96 is preferably additionally conventionally connected to the first microprocessor 80, at port p5 thereof, for providing thereto a reference voltage sample signal "Vref". Optionally, the micro-controller 42 may also include of a third operational amplifier 98, conventionally electrically connected between the reference voltage generating structure 96 and the pressure sensing structure 48 for providing an amplified reference voltage signal Vref thereto. The pressure sensing structure 48 (FIG. 1) samples the air pressure of the tire 10 via the tubular portion 52 (FIG. 2 thereof extending into the tire cavity 16, and provides first and second analog pressure signals "Ps1" and "Ps2 "(FIGS. 4 and 5) corresponding thereto to the instrumentation amplifier 95. And, the instrumentation amplifier 95 generates and provides to the first microprocessor 80, at port p7 thereof, an analog pressure difference sample signal "Pds" corresponding to the difference between the pressure signals Ps1 and Ps2. The pressure difference sample Pds is generally at a maximum when the sensed pressure is at its full scale limit, and is at a minimum when the tire 10 is fully deflated.

The micro-controller 42 (FIG. 3) additionally includes a conventional oscillator 100 having clock input and clock output leads, "Cin" and "Cout, respectively electrically connected to the first microprocessor 80 at ports p9 and p10 thereof and thus to the clock circuit 83 thereof.

Moreover, the micro-controller 42 (FIG. 3) preferably includes conventional watchdog timing structure 105 that is conventionally electrically connected across the data and reset leads, Ld and Lr, of the transmitting structure 50 and to port p13 of the first microprocessor 80. The watchdog timing structure 105 includes a third conventional microprocessor 106 having a conventional, internal, low frequency counting oscillator 107. Moreover, the watchdog timing structure 105 includes higher frequency oscillator 108 externally of the third microprocessor 106. The internal counting oscillator 107 continuously counts successive seconds for a predetermined time interval, provides a count signal Cs to the reset-signal generating oscillator 108 upon counting for the predetermined time interval, and then recycles to commence a new count. If the watchdog timing structure 105 does not detect a voltage signal Vs1 at port p13 of the first microprocessor 80 and a transmitter data signal Ds, then, upon receiving the count signal Cs, the reset signal generating oscillator 108 provides a wake-up resetting signal "Wup" to both the transmitter microprocessor 84, on the reset lead Lr, and the first microprocessor 80 via a conventional high impedance pull-up resistor 110 connected to port p1 of the first microprocessor 80.

The micro-controller 42 also includes a single pole, double throw, electronic switch 112. The switch 112 preferably includes a input signal lead "Lin" electrically connected to the first microprocessor 80, at port 15 thereof, for receiving input signals therefrom. In addition, the switch 112 has a common lead "Lc" electrically connected to the data lead Ld extending between the transmitting structure 50 and the first microprocessor 80, at port 11 thereof. Furthermore, the switch 112 includes normally closed and normally open switch leads, "Lnc" and "Lno", respectively electrically connected to the first microprocessor 80 at ports p17 and p18 thereof. When the switch 112 is in the normally open position thereof, data from port p18 of the first microprocessor 80, is applied to the data lead Ld of the transmitter structure 50 for use thereby. When the switch 112 is in the normally closed position thereof, data on the data lead Ld of the transmitter structure 50 is applied to port p17 of the microprocessor 80 for use thereby. The switch 112 is usually in the normally open position thereof, for providing temperature, pressure, reference voltage level and transmitter voltage level data 114 to the transmitter structure 50. After having provided such data 114, the first microprocessor 80 applies a signal 116 from port p15 to the switch 112, resulting in the switch 112 being switched to the normally closed position. Whereupon the transmitter structure 50 provides an acknowledgement signal 118 to the first microprocessor 80 and returns the data 122 thereto. In the event that such data 122 is returned without an acknowledgement signal 118, the first microprocessor 80 causes the switch 112 to be returned to the normally open position thereof and repeats the provision of the data 122, and so on, until either an acknowledgement signal 124 is provided to the first microprocessor 80 or the data has been applied to the data lead Ld at least two times.

The battery 51 is conventionally electrically connected to the first microprocessor 80 by means of a first RC circuit 124, having a first conventional storage capacitor 126 for providing a first stabilized input voltage "Vs1" at port p20 of the first microprocessor 80, at the switch 112 and at the watchdog timing structure 105, for respective energization thereof. Moreover, the battery 51 is conventionally electrically connected to the transmitting structure 50 by means of a second RC circuit 128, having a second conventional storage capacitor 130 for providing a second stabilized input voltage "Vs2" to the transmitter structure 50. The micro-controller 42 (FIGS. 3 and 4) also preferably includes transmitter voltage sensing structure 136 that is conventionally electrically connected between the second storage capacitor 130 and at port p4 of the first microprocessor 80, for sensing the transmitter-structure input voltage Vs2 and providing an input voltage sample signal "Vs2s" to port p5 of first microprocessor 80. The transmitter input voltage sensing structure 136 preferably includes a high impedance voltage dividing circuit 138 having a first high impedance resistor 140 connected in series with the first microprocessor 80 and a second high impedance resistor 142 connected across the first microprocessor 80 to ground "G1". Optionally, the transmitter input voltage sensing structure 136 may include a fourth operational amplifier 141 that is conventionally electrically connected between the first resistor 140 of the voltage dividing circuit 138 and the first microprocessor 80 for providing an amplified transmitter voltage input sample signal Vs2s to the first microprocessor 80. The first microprocessor 80 additionally includes a voltage output lead "Vs1" extending to the sensing structures 44, 46, the reference voltage generating structure 96 and the instrumentation amplifier 95, respectively for operation thereof. Moreover, assuming the provision of any of the first, second third or fourth operational amplifiers, 90, 92, 98, or 140, the voltage output lead Vs1 would also extend thereto for operation thereof.

Figure 5:
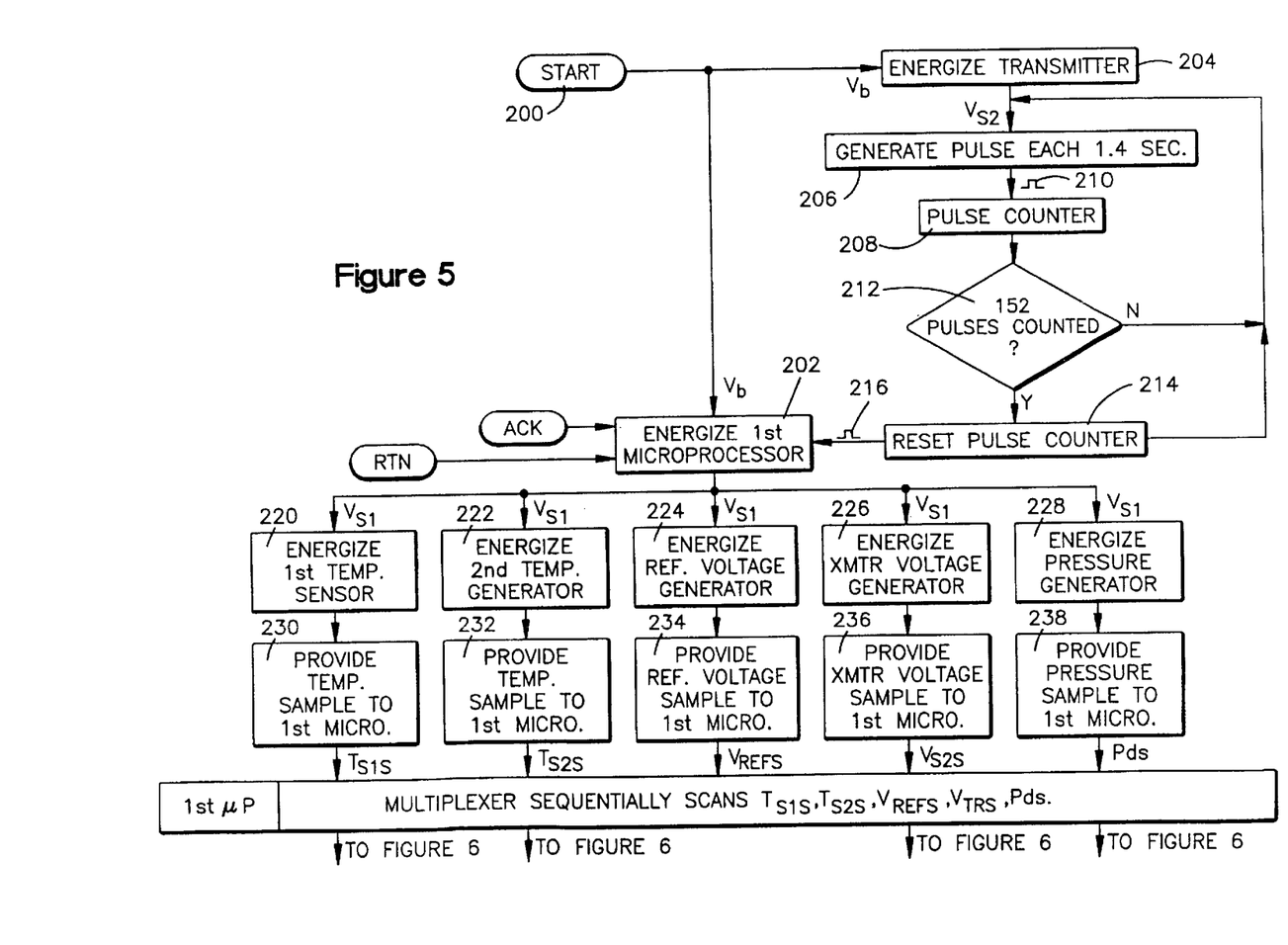
FIG. 5 is a flow chart portraying a portion of a process according the invention.
Figure 6A:
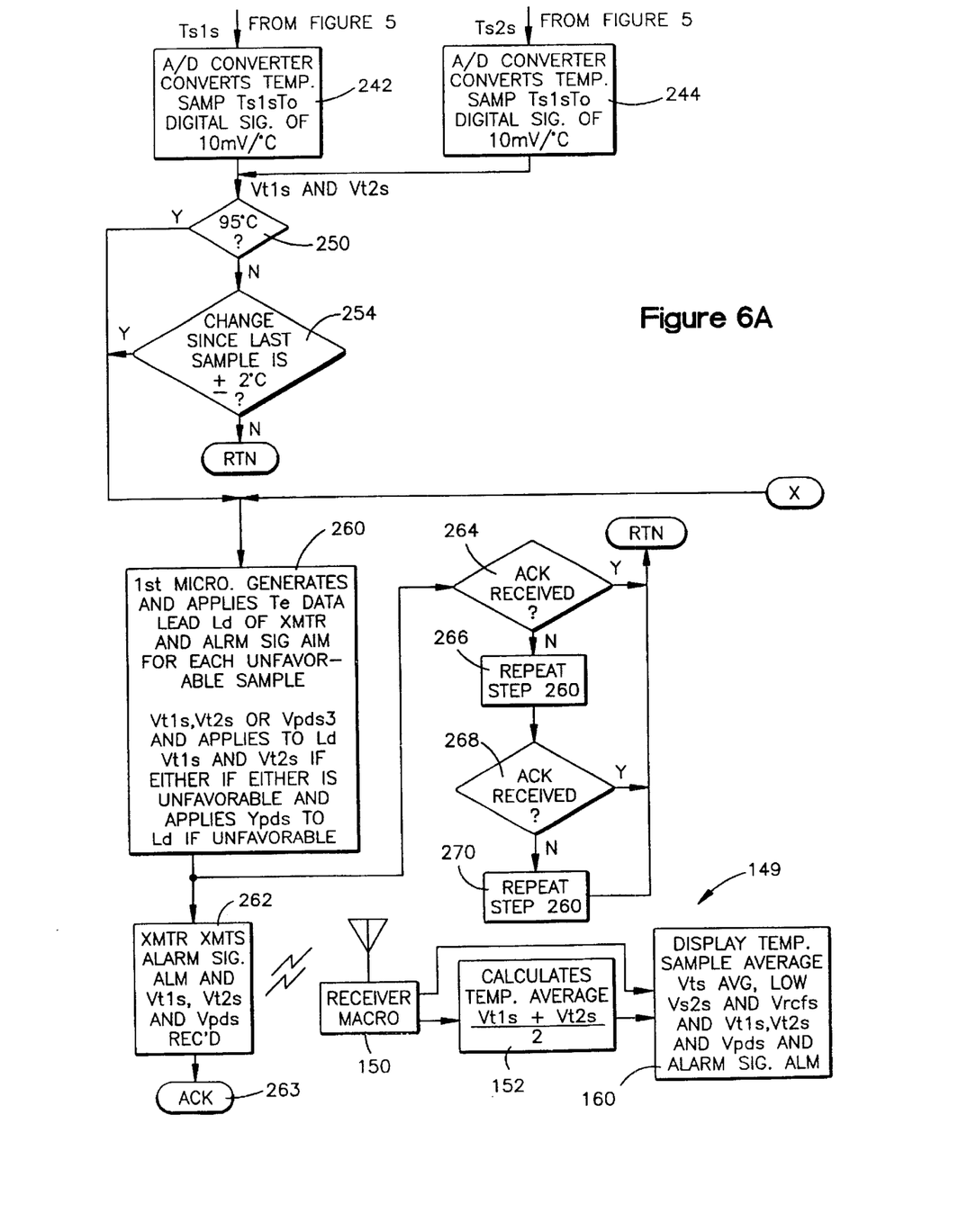
FIGS. 6A and 6B comprise a flow chart portraying another portion of the process shown in FIG. 4.
Figure 6B:
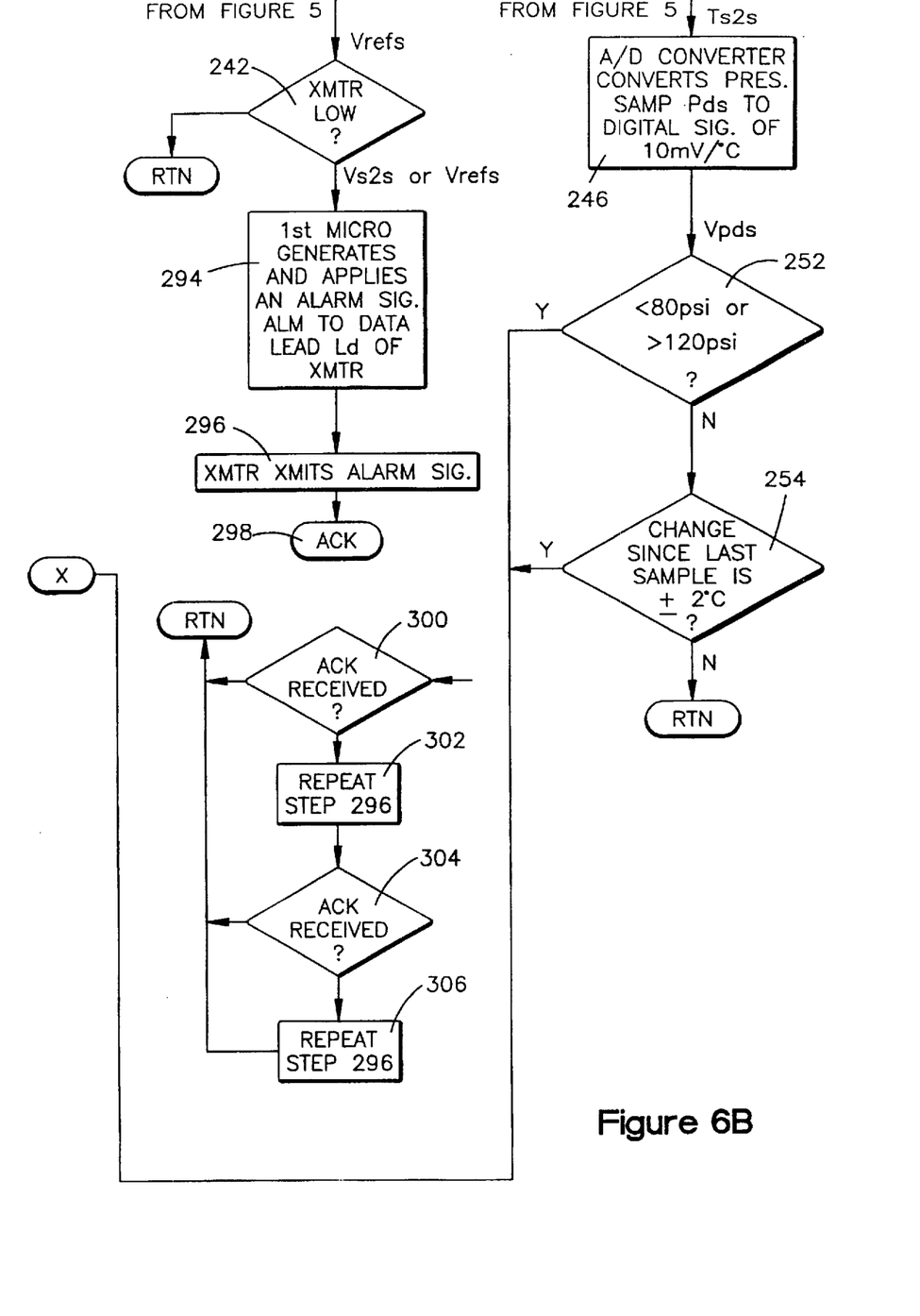

It is noted that the first, second and third microprocessors 80, 84, and 106, respectively, are conventionally programmed to execute each of the steps, if any, attributed thereto in the foregoing discussion and in following process. When the tag 40 (FIG. 1) is installed in a tire 10 that is inflated and mounted on the wheel rim 12 of a vehicle 11, exemplified by an OTR vehicle, the process portrayed in FIGS. 5 and 6 is started (step 200). Thereafter, the first microprocessor 80 and transmitter structure 50, and thus the second microprocessor 84 thereof, are concurrently energized (steps 202 and 204). The second microprocessor 84 of the transmitter structure 50 then generates a pulse 210 (step 206) at the end of a predetermined time interval, exemplified by the time interval of 1.4 seconds. The pulse 206 is applied by the second microprocessor 84 to the internal pulse counter 85 (step 208) followed by the second microprocessor 84 implementing the step 212 of inquiring whether a predetermined pulse count, exemplified by a pulse count of 152 pulses, has been attained. Assuming, the inquiry is answered negatively (step 210), processing is returned to step 206 and recycled therethrough and through steps 210, and 212 until the inquiry of step 212 is answered affirmatively. Without departing from the spirit and scope of the invention, the pulse counter 85 may be conventionally loaded with a predetermined count, exemplified by the count of 152 pulses, and be programmed to sequentially count down to zero in response to the application thereto of sequential pulses 210. In either case, when the inquiry of step 212 is answered affirmatively, the second microprocessor 84 causes the pulse counter 83 to be reset (step 214), return processing to step 206 to recommence the aforesaid pulse generation and counting process, and provide another count signal 216 to the first microprocessor 80.

Upon detecting the count signal 216 (FIG. 5), the first microprocessor 80 applies the voltage Vs1 to the first and second temperature sensing structures 44 and 46, the reference voltage generating structure 96, the transmitter voltage sensing structure 136 and the pressure sensing structure 48 (steps 220, 222, 224, 226 and 228, respectively) for energization thereof. As a result, the first and second temperature sensing structures 44 and 46, respectively, provide first and second temperature samples Ts1 and Ts2 (steps 230 and 232) to the first microprocessor 80, which are representative of the respective temperatures of the tire innerliner 35 and the tire cavity 16. In addition, the reference voltage generating structure 96 provides a reference voltage sample Vrefs to the first microprocessor 80 (step 234) that is representative of the reference voltage Vref. In addition, the transmitter voltage sensing structure 136 provides a transmitter voltage sample Vs2s to the first microprocessor 80 (step 236) that is representative of the transmitter voltage Vs2. And the tire pressure instrumentation amplifier provides a pressure difference sample Pds to the first microprocessor 80 (step 238) that is representative of the air pressure Ps1 of the tire 10.

The multiplexer 82A of the first microprocessor 80 conventionally sequentially scans ports p2–p5 and p7 thereof and sequentially applies the temperature and pressure signals to the A/D converter thereof. The A/D converter 82 sequentially converts the respective first and second temperature samples, Ts1s and Ts2s (steps 242 and 244) to respective digital temperature signals Vt1s and Vt2s, each having a voltage level of 10 millivolts per degree C. (centigrade), and converts the pressure difference sample Pds (step 246) to a digital pressure difference signal Vpds having a voltage level of the 16 millivolts per pound per square inch. The first microprocessor 80 then sequentially inquires (steps 250 and 252), whether the respective digital temperature sample signals Vt1s and Vt2s are greater than a predetermined voltage level corresponding to a high temperature, exemplified by the temperature of 95 degrees C., and whether the digital pressure difference sample signal Vpds is less than a predetermined voltage level corresponding to low pressure, exemplified by the pressure of 80 pounds per square inch, or greater than a predetermined voltage level corresponding to high pressure, exemplified by the pressure of 120 pounds per square inch. Assuming each of the inquiries of steps 250 and 252 are negatively answered, the first microprocessor 80 inquires, steps 254 and 256, whether the respective digital temperature sample signals, Vt1s and Vt2s, have changed by a predetermined voltage amount corresponding to a selected temperature change, exemplified by the temperature change of plus or minus 2 degrees C., since the last temperature sample was taken, and whether the digital pressure difference sample signal Vpds has changed a predetermined voltage amount corresponding to a selected pressure change, exemplified by the pressure change of plus or minus 2 pounds per square inch, since the last pressure difference sample was taken. Assuming each of 254 and 256 are answered negatively, then processing is returned to step 202.

On the other hand, if any of the inquires of steps 250, 252, 254 or 256 (FIG. 6) is affirmatively answered, an unfavorable temperature sample, Vts1 or Tts2, or an unfavorable pressure difference sample signal Vpds or both, has been taken. Whereupon, the first microprocessor 80 applies both of the temperature sample signals, Vt1s and Vt2s, to the data lead Ld of the transmitter microprocessor 84 (step 260), if either of such temperature samples signals, Vt1s or Vt2s, is unfavorable, or applies the pressure difference sample signal Vpds to the data lead Ld of the transmitter microprocessor 84 (step 260), if the pressure difference sample Vpds is unfavorable, or applies both of the temperature sample signals, Vt1s and Vt2s, and the pressure difference sample signal Vpds to the data lead of the transmitter microprocessor 84 (step 260), if either of the temperature sample signal, Vs1s or Vs2s and the pressure difference sample signal Vpds are unfavorable. In addition, if any of the temperature or pressure difference sampling signals, Vts1, Vts2 or Vpds, is unfavorable, the first microprocessor 80 generates and applies an alarm signal "Alm" to the data lead Ld of the transmitter microprocessor 84 (step 260). Upon receiving the aforesaid alarm and sample signals, Alm, Vts1 and Vts2 and/or Vpds, the transmitter structure 84 preferably the transmits (step 262), such signals, Alm, Vtsl and Vts2 and/or Vpds, a plurality of times, for example 12 times, to a remote receiver 150 followed by the step 263 of providing a transmission acknowledgement signal ACK to step 202 of the first microprocessor 80 and thereby returning processing thereto. The procedure of providing for multiple signal transmissions has been adopted to be sure that the transmitted signals, Alm, Vtsl and Vts2 and/or Vpds, are received by the remote receiver 150, which may be scanning for other input signals, outside of the scope of the present invention, at the time of the original transmission by the transmitter structure 50.

In addition to providing the signals Alm, Vts1 and Vts2 and/or Vpds (step 260) to the transmitter structure 50, the first microprocessor 80 inquires (step 264) whether the aforesaid acknowledgement signal ACK has been received. Assuming that the inquiry of step 264 is negatively answered, then, step 260 is repeated, step 266, followed by the first microprocessor 80 again inquiring (step 268) whether the aforesaid acknowledgement signal has been received. Assuming that step 268 is negatively answered, then, step 260 is again repeated (step 270), followed by returning processing to the first microprocessor (step 202). Assuming that either of steps 264 or 266 is affirmatively answered, processing is also returned to step 202.

As shown in FIG. 3 and in step 240 (FIG. 5), the multiplexer 82A of the first microprocessor 80 also sequentially scans ports p4 and p5 for the transmitter input voltage sample signal Vs2s and reference voltage sample signal Vrefs. Upon detecting such signals Vs2s, the microprocessor 80 sequentially inquires whether the transmitter input voltage sample signal Vs2s is low (step 290). Assuming the answer to the inquiry of step 290 is negative, then processing is returned to step 202, and, assuming the inquiry of step 292 is negative, processing is also returned to step 202. Assuming however that the answer to either or both of the inquiries of steps 290 and 292 is or are negative, indicating that either or both of the sample signals Vs2s is unfavorable, then, the first microprocessor 80 (step 294) generates and applies an alarm signal Alm, for each unfavorable sample signal Vs2s or Vrefs, to the data lead Ld of the second microprocessor 84 of the transmitter structure 50. Upon receiving the aforesaid alarm and sample signals Alm, Vs2s or Vrefs, or both, the transmitter structure 84 (step 296) preferably transmits such signals Alm and Vs2s, a plurality of times, for example 12 times for the reason hereinbefore discussed, to the remote receiver 150 followed by the step 298 of providing a transmission acknowledgement signal ACK to the first microprocessor 80 (step 202) thereby returning processing thereto.

In addition, to providing the signals Alm, and Vs2s or both to the transmitter structure 50, the first microprocessor 80 inquires (step 300), whether the aforesaid acknowledgement signal ACK has been received. Assuming that the inquiry of step 300 is negatively answered, then, step 296 is repeated (step 302), followed by the first microprocessor 80 again inquiring (step 304) whether the aforesaid acknowledgement signal ACK has been received. Assuming that step 304 is also negatively answered, then, step 296 is again repeated (step 306), followed by returning processing to the first microprocessor 80 (step 202). Assuming that either or both of steps 302 or 306 is affirmatively answered, then processing is also returned to step 202 of the first microprocessor 80.

The tag 40 (FIG. 1) according to the invention can be incorporated in a monitoring system 149 including the remote computer 150 (FIG. 6) and a display 160 which conventionally electrically connected the remote computer 150. The remote receiver 150 can include a conventional microprocessor 152 that is conventionally programmed to calculate the sum of the respective temperature sample signals Vt1s and Vt2 and divide the sum by the numeral 2, to generate an average temperature sample signal Vtsavg. In addition, remote computer microprocessor 152 is conventionally programmed to cause the display 160 to display the respective alarm and sample signals Alm,Tt1s, Tt2s, Vs2s, Vrefs, and Vpds received from the transmitter structure 50 and to display the temperature sample signal average Vtsavg generated by the remote microprocessor 152.

Although the inventions described herein have been shown in a few embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. Method of monitoring conditions of a pneumatic tire, the pneumatic tire comprising a central tread, one or more belt(s) disposed radially inwardly of the tread and an innerliner disposed radially inwardly of the belt, the belt(s) having a side edge, comprising disposing an electronic tag and associated condition sensors within the tire, characterized by:

sensing a first temperature which is the temperature of the tire innerliner substantially immediately radially inward of the belt edge with the electronic tag;

sensing a second temperature which is the air temperature within the tire with the electronic tag; and sensing air pressure within the tire with the electronic tag.

2. A method, according to claim 1, characterized by:

sensing the conditions by performing sensing at a sequence of discrete time intervals.

3. A method, according to claim 2, characterized by:

comparing a value of one or more of the conditions sensed at an immediately previous time interval to a current value of the one or more conditions.

4. A method, according to claim 2, characterized by:

at a current time interval, determining whether select one or more of the conditions has changed by a threshold amount since an immediately previous time interval.

5. A method, according to claim 4, characterized in that:

the select one or more conditions is either or both of the first and second temperatures; and the threshold amount is plus or minus two degrees centigrade.

6. A method, according to claim 4, characterized in that:

the select one or more conditions is the air pressure within the tire; and the threshold amount is plus or minus two pounds per square inch.

7. A method, according to claim 1, characterized by:

disposing the electronic tag at a shoulder portion (28) of the tire.

8. A method, according to claim 1, characterized by:

disposing the electronic tag at an area of the innerliner where the tire is thickest.

9. A method, according to claim 1, characterized by:

disposing the electronic tag at an area of the innerliner where the tire is least able to dissipate heat.

10. A method, according to claim 1, characterized by:

disposing the electronic tag at an area of the innerliner where the temperature samples are the most closely related to determining whether or not an internal breakdown of the tire is imminent.

* * * * *